United States Patent
Chan et al.

(10) Patent No.: US 9,389,941 B2
(45) Date of Patent: Jul. 12, 2016

(54) METHODS FOR DIAGNOSING HARDWARE COMPONENT FAILURE AND DEVICES THEREOF

(71) Applicant: NetApp, Inc., Sunnyvale, CA (US)

(72) Inventors: Johnny Kang-Wing Chan, Sunnyvale, CA (US); Anish Kumar Gupta, Fremont, CA (US); Saringni Addepally, San Jose, CA (US); Pathiban D P, Palapallam Post (IN)

(73) Assignee: NetApp, Inc., Sunnyvale, CA (US)

( * ) Notice: Subject to any disclaimer, the term of this patent is extended or adjusted under 35 U.S.C. 154(b) by 198 days.

(21) Appl. No.: 14/182,324

(22) Filed: Feb. 18, 2014

(65) Prior Publication Data

US 2015/0234698 A1    Aug. 20, 2015

(51) Int. Cl.
  *G06F 11/00*    (2006.01)
  *G06F 11/07*    (2006.01)
(52) U.S. Cl.
  CPC ........ *G06F 11/0772* (2013.01); *G06F 11/0709* (2013.01); *G06F 11/0787* (2013.01)
(58) Field of Classification Search
  CPC ............ G06F 11/0772; G06F 11/0787; G06F 11/0766; G06F 11/0778; G06F 11/079; G06F 11/3003; G06F 11/3024; G06F 11/3034; G06F 11/3048; G06F 11/3065; G06F 11/3089; G06F 11/321; G06F 11/0709
  See application file for complete search history.

(56) References Cited

U.S. PATENT DOCUMENTS

| | | | | |
|---|---|---|---|---|
| 6,233,680 B1 * | 5/2001 | Bossen | ............... | G06F 11/0772 713/1 |
| 7,206,970 B1 * | 4/2007 | Lauterbach | ......... | G06F 11/2289 713/2 |
| 2004/0083327 A1 * | 4/2004 | Schillaci | ............. | G06F 12/0653 711/1 |
| 2011/0029960 A1 * | 2/2011 | Cimadamore | ........ | G06F 11/327 717/141 |
| 2014/0047204 A1 * | 2/2014 | Harman | ................... | G06F 3/065 711/162 |

* cited by examiner

*Primary Examiner* — Bryce Bonzo
*Assistant Examiner* — Anthony J Amoroso
(74) *Attorney, Agent, or Firm* — LeClairRyan, a Professional Corporation

(57) ABSTRACT

A method, non-transitory computer readable medium, and storage server device that determines with a service processor when a system processor has experienced an error, the system processor coupled to a data storage device via a system port of the data storage device. Diagnostic information is retrieved with the service processor from the data storage device via a service port of the data storage device, when the system processor is determined to have experienced an error. The diagnostic information includes error or exception information associated with one or more hardware components. The retrieved diagnostic information is output by the service processor.

21 Claims, 6 Drawing Sheets

Data Record Header

| Offset | Size (Bytes) | Description |
|---|---|---|
| 0 | 1 | Type - Data Record type |
| 1 | 1 | Flag - This is a data record type specific field. |
| 2 | 2 | Length - The length of this record not including the header |
| 4 | 8 | Timestamp - UNIX time in seconds since Epoch. Same as time_t and the return value of the standard C function time(). |
| 12 | Variable Length | Data - variable size record body. |

FIG. 4

Data Record Type

| Value | Type |
|---|---|
| 0 | Invalid |
| 1 | Message Log |
| 2 | DIMM Error |
| 3 | CPU Error |
| 4 | PCI Error |
| 5 | SPD Error |

FIG. 5

PCI Error Record

| Offset | Size (Bytes) | Description |
|---|---|---|
| 0 | 1 | Type - PCI Error Record type. |
| 1 | 1 | Flag - Not used. |
| 2 | 2 | Length - The length of this record not including the header. (4 bytes) |
| 4 | 8 | Timestamp - UNIX time in seconds since Epoch. Same as time_t and the return value of the standard C function time(). |
| 12 | 1 | Bus - PCI bus number which corresponds to the failed device. |
| 13 | 1 | Slot - PCI slot number which corresponds to the failed device. |
| 14 | 1 | Func - PCI function number which corresponds to the failed device. |
| 15 | 1 | PSlot - Physical slot number which corresponds to the failed device. |
| 16 | 1 | Error - Error code TBD. |
| 17 | 1 | Action - Action code TBD. |
| 18 | 2 | Reserved |

FIG. 6

```
Usage: ssram -a | -h | -i | -m | -p | -r | -v | -w | -R | -W
       Region and record type
         (-g <region type>)
         (-t <record type>)
       Record data
         (-l <tag string>)
         (-x <data size>)
         (<write data>)
       Raw read and write
         (-o <offset>)
         (-x <data size>)
         (<write data>)
       Options
         (-c <access mode>)
```

FIG. 7

SSRAM Commands

| Command Option | Description |
|---|---|
| a | Print region. Requires -g. |
| h | Print region header. Requires -g. |
| i | Initialize region. Requires -g. |
| m | Set SRAM access mode. Requires -g and -c. |
| p | Trigger the SRAM driver to retrieve the content of the specified region and print the formatted text to the console. Requires -g. |
| r | Read record from region. Requires -g and -o. |
| v | Validate region header. Requires -g. |
| w | Write record to region. Requires -g and -t. Also record should be specified with options -l, and -x with write data. |
| R | Raw read from region. Requires -g, -o and -x. |
| W | Raw write to region. Requires -g, -o and -x. Also a stream of data bytes must be specified that matches with the -x option. |

FIG. 8

METHODS FOR DIAGNOSING HARDWARE COMPONENT FAILURE AND DEVICES THEREOF

FIELD

This technology generally relates to diagnosing hardware component failure and, more particularly, to methods and devices for using a service processor and a dual port data storage device to retrieve diagnostic information in the event of a system processor failure.

BACKGROUND

In order to diagnose a hardware component failure, computing devices, such as storage server devices, are configured to output diagnostic information regarding the error(s) resulting in the failure to a memory location. The output diagnostic information can include where the error originated, the severity of the error, health information gathered by monitoring the hardware component prior to the occurrence of the error, or any other information useful for a technician to diagnose the error. Often, hardware components experiencing an error must be replaced and the diagnostic information facilitates efficient identification of the failed hardware component and replacement of the component to minimize system downtime.

The process of retrieving the diagnostic information from the memory location can be handled by an operating system executed by the system processor that is used to carry out many of the functions of the computing device. However, during hardware exception processing many software and hardware components may be unreliable or unavailable and the operating system may not perform as expected or be loaded at all by the system processor. In the event that the system processor fails to successfully load the operating system, a technician may be unable to access the memory location to retrieve the diagnostic information that can be used to diagnose a hardware component failure, which is undesirable.

SUMMARY

A storage server device includes a data storage device storing diagnostic information and having a service port and a system port. The diagnostic information includes error or exception information associated with one or more hardware components of the storage server device. The storage server device further includes a system processor coupled to the service port of the data storage device and a service processor coupled to the system port of the data storage device. The service processor is further coupled to memory storing instructions which, when executed by the service processor, are configured to perform steps including determining when the system processor has experienced an error, retrieving the diagnostic information from the data storage device via the service port of the data storage device, when the system processor is determined to have experienced the error, and outputting the retrieved diagnostic information.

A method for diagnosing hardware component failure includes determining with a service processor when a system processor has experienced an error, the system processor coupled to a data storage device via a system port of the data storage device. Diagnostic information is retrieved with the service processor from the data storage device via a service port of the data storage device, when the system processor is determined to have experienced the error. The diagnostic information includes error or exception information associated with one or more hardware components. The retrieved diagnostic information is output by the service processor.

A non-transitory computer readable medium having stored thereon instructions for diagnosing hardware component failure includes machine executable code which when executed by a service processor, causes the service processor to perform steps including determining when a system processor has experienced an error, the system processor coupled to a data storage device via a system port of the data storage device. Diagnostic information is retrieved from the data storage device via a service port of the data storage device, when the system processor is determined to have experienced the error. The diagnostic information includes error or exception information associated with one or more hardware components. The retrieved diagnostic information is output by the service processor.

With this technology, a service processor, operating independently from the system processor and executing a separate operating system, can advantageously retrieve diagnostic information from memory even if the system processor is unable to successfully execute the main operating system. The service processor and system processor are coupled to respective ports or interfaces of a dual port memory which allows the service processor to continue functioning, and in particular to continue to be able to retrieve the diagnostic information, in the event of a system processor failure. The memory is configured to be persistent such that the diagnostic information is maintained across a system reboot, such as may occur automatically in some computing systems upon occurrence of a system crash.

Accordingly, this technology advantageously allows technicians or administrators, for example, to diagnose issues relating to hardware components even in the event of a system processor failure. Thereby, hardware components can be swapped or fixed relatively quickly and system downtime can be reduced.

BRIEF DESCRIPTION OF THE DRAWINGS

FIG. 4 is a table illustrating an exemplary data record format for the diagnostic information stored in a data storage device;

FIG. 5 is a table illustrating exemplary types of data records included in the diagnostic information stored in the data storage device;

FIG. 6 is a table illustrated an exemplary data record for the PCI error data record type according the data record format of FIG. 4;

FIG. 7 is a table illustrating exemplary commands useful to communicate with the service processor through a command line interface to retrieve diagnostic information from the data storage device; and FIG. 8 is a table illustrating exemplar command options corresponding to and used in combination with the exemplary commands illustrated in FIG. 7 to retrieve diagnostic information from the data storage device.

DETAILED DESCRIPTION

Figure 1:
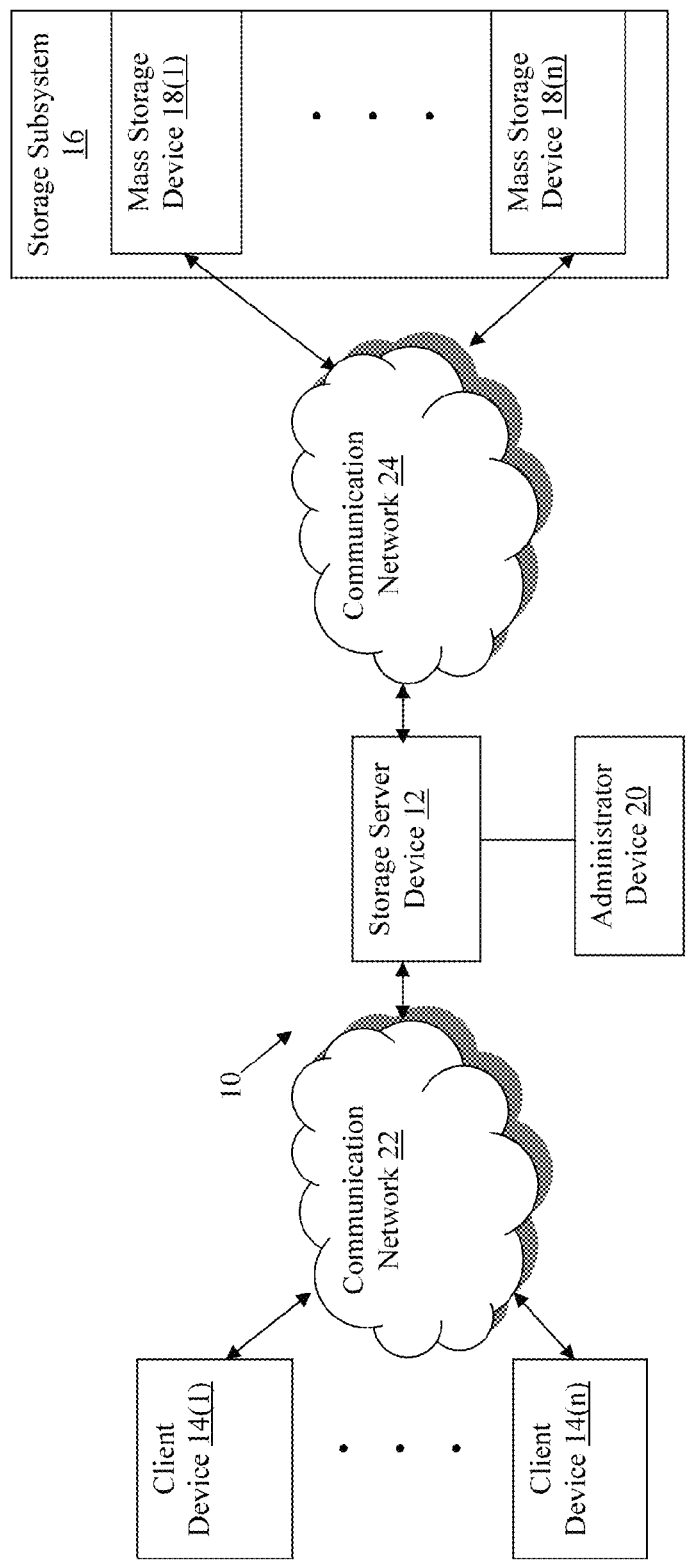
FIG. 1 is a block diagram of a network environment which incorporates an exemplary storage server device.

A network environment 10 with an exemplary storage server device 12 is illustrated in FIG. 1. The environment 10 further includes client devices 14(1)-14(n), a storage subsystem 16 including mass storage devices 18(1)-18(n), and an administrator device 20, although this environment 10 can include other numbers and types of systems, devices, components, and/or elements in other configurations, such as multiple numbers of each of these apparatuses and devices. The client computing devices 14(1)-14(n) are in communication with the storage server device 12 through communication network 22 and the storage server device 12 is in communication with the storage subsystem 16 through communication network 24. The communication networks 22 and 24 can be local area networks (LANs), wide area networks (WANs), or combination thereof, for example. This technology provides a number of advantages including methods, non-transitory computer readable medium, and devices that more effectively diagnose hardware component failure in a storage server device, thereby reducing downtime.

The storage server device 12 operates on behalf of the client devices 14(1)-14(n) to store and manage shared files or other units of data (e.g., blocks) in the mass storage devices 18(1)-18(n). Accordingly, each of the client devices 14(1)-14(n) can include a processor, a memory, a communication interface, an input device, and a display device, which are coupled together by a bus or other link, although each of the client devices can have other types and numbers of components or other elements and other numbers and types of network devices could be used. The client devices 14(1)-14(n) may run interface applications that provide an interface to make requests for and send content and/or data to the storage server device 12 via the communication network 22, for example. Each of the client devices 14(1)-14(n) may be, for example, a conventional personal computer (PC), a workstation, a smart phone, or other processing and/or computing system.

The storage server device 12 manages the storage subsystem 16 in this example and receives and responds to various read and write requests from the client devices 14(1)-14(n), directed to data stored in, or to be stored in, the storage subsystem 16. The mass storage devices 18(1)-18(n) in the storage subsystem 16 may be, for example, conventional magnetic disks, optical disks such as CD-ROM or DVD based storage, magneto-optical (MO) storage, or any other type of non-volatile storage devices suitable for storing large quantities of data. The mass storage devices 18(1)-18(n) may be organized into one or more volumes of Redundant Array of Inexpensive Disks (RAID), although other types and numbers of storage devices in other arrangements can be used.

Figure 2:
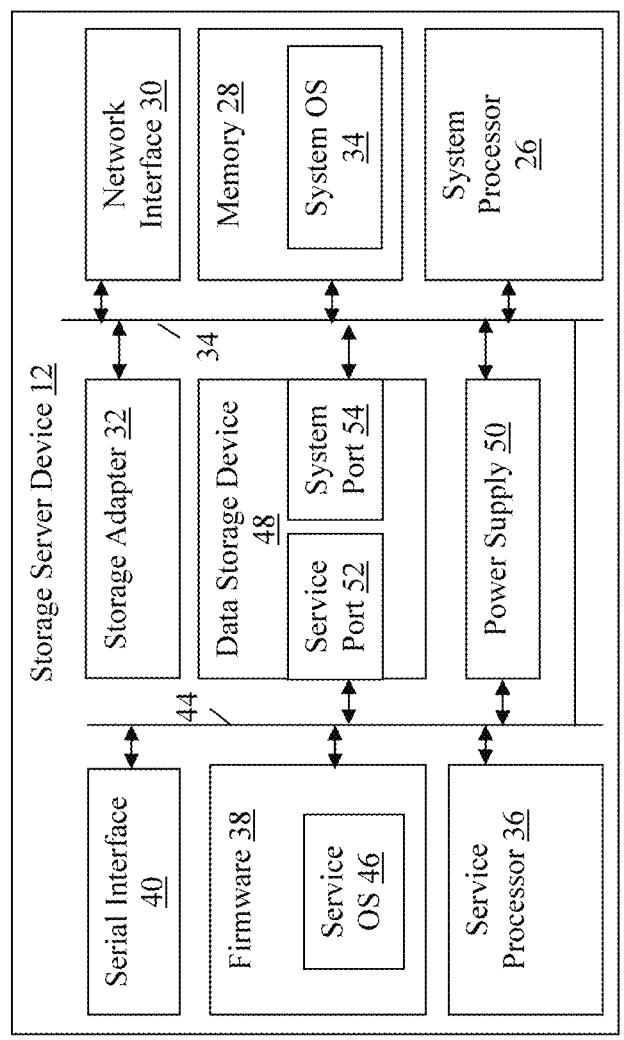
FIG. 2 a block diagram of the exemplary storage server device.

Referring more specifically to FIG. 2, a block diagram of the exemplary storage server device 12 is illustrated. The storage server device 12 may be, for example, a file server, and more particularly, a network attached storage (NAS) appliance. Alternatively, the storage server device 12 may be a server that provides the client devices 14(1)-14(n) with access to information organized as data containers, such as individual data blocks, as may be the case in a storage area network (SAN). In yet another example, the storage server device 12 may be a device that provides the clients devices 14(1)-14(n) with access to data at both the file level and the block level.

In this example, the storage server device 12 includes a system processor 26, memory 28, a network interface 30, and a storage adapter 32 coupled together by a system bus 34 or other communication link. In this example, the bus 34 is a Peripheral Component Interface (PCI), although other bus types and links may be used.

The system processor 16 of the storage server device 12 may be, for example, one or more programmable general-purpose or special-purpose microprocessors or digital signal processors (DSPs), microcontrollers, application specific integrated circuits (ASICs), programmable logic devices (PLDs), or a combination of such devices, although other types and numbers of processing devices could be used. The memory 28 may be, or may include, any of various forms of read-only memory (ROM), random access memory (RAM), Flash memory, or the like, or a combination of such devices. The memory 28 stores the system operating system (OS) 32 of the storage server device 12, although the memory can store other types and amounts of programmed instructions and other data.

The network interface 30 of the storage server device 12, which can be an Ethernet adapter for example, operatively couples and communicates between the storage server device 12 and the client devices 14(1)-14(n), which are coupled together by the communication networks 22 and 24, although other types and numbers of communication networks or systems with other types and numbers of connections and configurations to other devices and elements also can be used. The storage adapter 32 allows the storage server device 12 to access the storage subsystem 16 and may be, for example, a Fibre Channel adapter or a Small Computer System Interface (SCSI) adapter, although other adapters could be used In this example, the storage server device 12 further includes a service processor 36 coupled to firmware 38, a serial interface 40, and a power supply 42 by a service bus 44 or other communication link, although the service processor 36 could also be coupled to one or more of the firmware 38, serial interface 40, or power supply 42 by the service bus 34. In this example, the bus 34 is a Peripheral Component Interface (PCI), although other bus types and/or other links may be used.

The service processor 36 monitors and/or manages the various hardware components of the storage server device 12, although the service processor 36 can monitor and/or manage other types of functions and other operations. The service processor 36 may be, for example, one or more programmable general-purpose or special-purpose microprocessors or digital signal processors (DSPs), microcontrollers, application specific integrated circuits (ASICs), programmable logic devices (PLDs), or a combination of such devices, although other types and numbers of processor could be used. The storage server device 12 can include such a service processor 36 in part to offload many hardware specific tasks from the system processor 26. This offloading of tasks by the service processor 36 provides the system processor 26 with more bandwidth to handle application specific tasks, thereby speeding the execution of applications executed by the system processor 26.

The service processor 36 in this example is independent and separate from the system processor 26 and is configured to operate independently of the system processor 26. The service processor 36 is independent from the system processor 26 in that the processing of the service processor 36 is not dependent on the system processor 26. In other words, the service processor 36 can function independently of the system processor 26 and therefore the service processor 36 can still function if the system processor 26 stalls or fails to successfully load or execute the system OS 34, or otherwise malfunctions.

Furthermore, the service processor 36 is physically separate from the system processor 26 in some examples where the internal components of the service processor 36 are separated from the system processor 26 by an intervening barrier or space. For example, the service processor 36 may be embodied within a microchip while the system processor 26 may be embodied in a different microchip. As explained in more detail below, the service processor 36 is configured to retrieve information from the system processor 26 or from other hardware components and such information may be used in the analysis or diagnosis of errors in the storage server device 12.

In this example, the service processor is coupled to firmware 38, although the service processor can be coupled to any other type of memory such as read-only memory (ROM), random access memory (RAM), Flash memory, or the like, or a combination of such devices. The firmware 38 stores, among other things, a service operating system (OS) 46 of the storage server device 12. When executed by the service processor 36, the service OS 46 can monitor the health of the system processor 26 and other hardware components of the storage server device.

The firmware 38 in the storage server device 12 further stores programmed instructions, as part of the service OS 46 and/or separate from the service OS, for one or more aspects of the present technology, as described and illustrated herein. When executed by the service processor 36, the programmed instructions cause the service processor 36 to carry out the steps necessary to implement the methods of the examples, as described and illustrated herein.

The serial interface 40 can be an RS-232 port or Universal Serial Bus (USB) port, for example, allowing a direct serial connection with, for example, a local administrator device 20 through a transmission line. In other examples, the administrator device 20 can communicate with the storage server device 12 through a communication network, such as communication network 24, via the network interface 30 of the storage server device 12. This configuration enables a network administrator or technician to perform management and/or diagnostic functions on the storage server device 12.

In this example, the storage server device 12 further includes a data storage device 48 having a service port 52 and a system port 54. The data storage device 48 stores, among other things, diagnostic information associated with various of the hardware components of the storage server device in this example, as described and illustrated in more detail later. In one example, the data storage device 48 is dual port random access memory (RAM), although other types of memory also can be used. The data storage device 48 is coupled to the system processor 26 and the service processor 36 through the system bus 34 and service bus 44 in this example, although the data storage device 48 could be coupled to the system processor 26 and the service processor 36 by one bus or by other types and numbers of communication links.

More specifically, in one example, the system processor 26 is coupled to the system port 54 of the data storage device 48 via a parallel interface and the service port 36 is coupled to the service port 52 of the data storage device 48 via a low pin count (LPC) interface, although other types of interfaces also can be used. In this example, the system processor 26 and the service processor 36 have access to respective regions of the data storage device 48 in which to store obtained diagnostic information regarding hardware components of the storage server device 12. Accordingly, with this exemplary configuration, the service processor 36 can retrieve diagnostic information stored on the data storage device 48 using the service port 52 even if the system processor 26 is unavailable, such as due to a failure to successfully load or execute the system OS 34, for example.

In this example, the storage server device 12 further includes a power supply 48 coupled to one or both of the system bus 34 or service bus 44. The power supply 50 provides power to the various hardware components of the storage server device 12. In this example, the power supply includes a battery, supercapacitor, or other power source configured to continue to supply power to the data storage device 48 in the event the storage server device 12 loses power, such as during a restart or reboot for example. Accordingly, the power supply 50 can be a battery or supercapacitor, for example, although other types and numbers of power supplies also can be used.

The administrator device 20 can be used in this example to interface with the storage server device 12 via the serial interface, for example, to configure the storage server device 12 and/or obtain information from the storage server device 12, such as diagnostic information stored on the data storage device 48 for example. Accordingly, the system OS 34 and service OS 46 can be configured to provide the administrator device 20 with an interface for inputting requests for diagnostic information and receiving the diagnostic information in response, as described and illustrated in more detail later.

Although examples of the storage server device 12, client devices 14(1)-14(n), a storage subsystem 16, and the administrator device 20 are described herein, it is to be understood that the devices and systems of the examples described herein are for exemplary purposes, as many variations of the specific hardware and software used to implement the examples are possible, as will be appreciated by those skilled in the relevant art(s). In addition, two or more computing systems or devices can be substituted for any one of the systems in any embodiment of the examples.

The examples may also be embodied as a non-transitory computer readable medium having instructions stored thereon for one or more aspects of the present technology as described and illustrated by way of the examples herein, as described herein, which when executed by the service processor 36, cause the service processor 36 to carry out the steps necessary to implement the methods of the examples, as described and illustrated herein.

Figure 3:
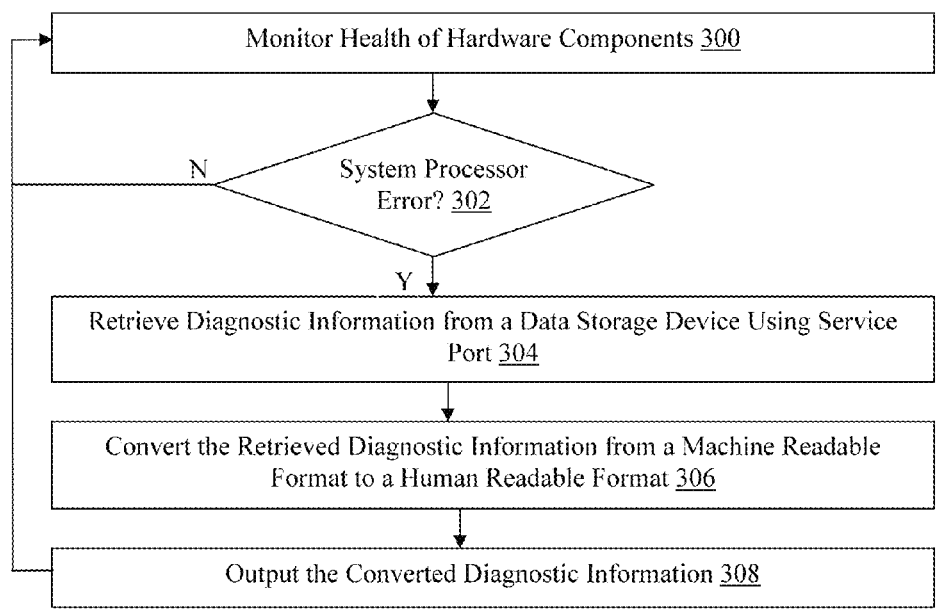
FIG. 3 is a flowchart of an exemplary method for diagnosing hardware component failure using a service processor and a data storage device.

Referring to FIGS. 1-8, an exemplary method for diagnosing hardware component failure using the service processor 36 and data storage device 12 of the storage server device 12 will now be described. Referring more specifically to FIG. 3, in step 300 in this example, the data storage device 12, using the service processor 36, monitors the health of other hardware components of the data storage device 12, as well as performs various other functions. In some examples, the service processor 36 executes the service OS 46 to manage various processes and/or services of the storage server device 12 to monitor hardware components of the storage server device 12.

Examples of such monitoring functionalities include data logging, setting platform event traps, and monitoring various parameters, characteristics, and/or outputs associated with hardware components of the storage server device 12. In other examples, the service processor 36 can log system events, such as boot progress, field replaceable unit changes, events generated by the system OS 34, and command history of the service processor 36. The information obtained during the monitoring in step 300 can be stored by the service processor 36 in the data storage device 48.

In particular, the service processor 36 can monitor the system processor 26 to determine, in step 302, when the system processor 26 has experienced an error. For example, the service processor 36 can determine that the system processor 26 has failed to successfully load the system OS 34 or has stalled, although other types of error conditions can also be experienced by the system processor 26 and identified by the service processor 36. In order to determine that the system processor 26 has experienced an error, the service processor 26 may receive various event signals from the system processor 26 notifying the service processor 36 of the error condition. The detection of a stall, for example, can be based on the receipt, or lack of receipt, of heartbeat messages sent at predetermined intervals from the system processor 26. If the service processor 36 does not determine that the system processor 26 has experienced an error, then the No branch is taken back to step 300 and the service processor 36 continues to provide the hardware component monitoring functionalities described and illustrated earlier.

Referring back to step 302, if the service processor 36 of the storage server device 12 determines that the system processor 36 has experienced an error, then the Yes branch is taken to step 304. In step 304, the service processor 36 of the storage server device 12 retrieves diagnostic information from the data storage device 48 using the service port 52. Accordingly, although the system processor 26 may be unavailable for servicing requests for diagnostic information, or performing any other function, the service processor 36 executing the service OS 46 can advantageously access the diagnostic information stored on the data storage device 48 using the service port 52.

The diagnostic information can be previously stored by the service processor 36 during the monitoring described and illustrated earlier with reference to step 300. In some examples, the diagnostic information also includes information stored by the system processor 26 in the data storage device 48 prior to the system processor 26 experiencing an error condition. Accordingly, the system processor 26 can also be configured to perform monitoring functions for various hardware components of the storage server device 12.

The diagnostic information can include where an error originated, the severity of the error, health information gathered by monitoring hardware component(s) prior to the occurrence of the error, or any other information useful for a technician to diagnose a hardware component failure that may have resulted in the system processor 36 experiencing an error condition. Referring more specifically to FIG. 4, exemplary data record format for the diagnostic information stored in the data storage device 48 is illustrated. In this example, the service processor 36 is configured to store diagnostic information obtained during the monitoring described and illustrated with reference to step 300 in data records having a format including fields including type, flag, length, timestamp, and data, although any other fields and formats also can be used and the diagnostic information can be stored in other ways.

Referring more specifically to FIG. 5, exemplary types of data records included in the diagnostic information stored in the data storage device 48 by the service processor 36 and/or system processor 26 are illustrated. In this example, the data record types include invalid, message log, dual in-line memory module (DIMM) error, a system processor 26 error, a Peripheral Component Interface (PCI) error, or a serial presence detect (SPD) error. The data record types are each associated with a respective value that is included in the type field of the exemplary data record format described and illustrated earlier with reference to FIG. 4. In other examples, other data record types can be used.

Referring more specifically to FIG. 6, an exemplary data record for the PCI error data record type according the data record format described and illustrated with reference to FIG. 4 is illustrated. In this example, the PCI error record can include diagnostic information associated with a failed PCI device connected to a PCI bus, such as bus 34 for example, and obtained and stored by the service processor 36. The exemplary PCI error data record includes type, flag, length, and timestamp fields according to the data record format described and illustrated with reference to FIG. 4.

The value field of the exemplary PCI error record includes bus, slot, function, physical slot number, error code, action, and reserved fields in this example, although other fields also can be used. The diagnostic information included in the exemplary fields of the PCI error record are included by the service processor 36 in this example and allows an administrator or technician of the storage server device 12 to identify a specific hardware component that failed.

Referring back to step 304 of FIG. 3, in some examples, the service processor 36 of the storage server device 12 can be configured to automatically retrieve the diagnostic information from the data storage device 48 when the service processor 36 determines the system processor 26, or any other hardware component, has experienced an error. In other examples, the service processor 36 can automatically dispatch an alert e-mail or other form of electronic alert message to the remote administrator device 20. In response, a user of the administrator device 20 can connect to the storage server device 12, such as through an interface provided by the service processor 36 for example, to command the service processor 36 to retrieve some or all of the diagnostic information from the data storage device 48.

For example, the service processor 36 can be connected to the administrator device 20 by way of a serial interface 40. In this connection, a user of the administrator device 20 can log into the storage server device 12 using a secure shell client application, for example. In response, the service processor 36 can provide a command line interface to the administrator device 20. The user of the administrator device 20 can then submit commands using the interface that can be processed by the service OS 46 and implemented by the service processor 36 to retrieve the diagnostic information.

Referring more specifically to FIGS. 7-8, exemplary commands useful to communicate with the service processor 36 through a command line interface to retrieve diagnostic information are illustrated. In this example, "SSRAM" refers to the data storage device 48. The various commands can be used to cause the service processor 36 to retrieve only portions of the diagnostic information stored on the data storage device 48, such as only data records of a specified type or stored in a specific region of the data storage device 48 in examples in which certain regions of the data storage device 48 are used respectively by the service processor 36 and the system processor 26 to store diagnostic information.

Other commands and methods of querying the data storage device 48 using the service processor 36 also can be used. Additionally, in other examples, the service processor 36 can also be connected to, and can transmit messages to and from, the administrator device 12 by way of the network interface 30. Other methods of communicating with the service processor 36 of the storage server device 12 also can be used.

In step 306, the service processor 36 of the storage server device 12 converts the retrieved diagnostic information from a machine readable format to a human readable format. In step 308, the service processor 36 of the storage server device 12 outputs the converted diagnostic information. The diagnostic information can be output to the administrator device 20, such as through the interface provided by the service processor 36 in step 304. In another example, the service processor 36 can be configured to output the diagnostic information to a flash or other non-volatile memory for later retrieval by a user of the administrator device 20. Other output locations also can be used for the diagnostic information.

With this technology, hardware component failures in storage server devices can be diagnosed using a service processor and a dual port data storage device even when a system processor has experienced an error. By operating independently from the system processor, based on a respective operating system and communication link to a respective port of the data storage device, the service processor can be used to retrieve diagnostic information when the system processor is unavailable. Accordingly, administrators and/or technicians can relatively efficiently identify the hardware component(s) that may require replacement, thereby reducing device downtime.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A storage server device, comprising:
   a dual port data storage device storing diagnostic information and comprising a service port and a system port, the diagnostic information comprising error or exception information associated with one or more hardware components;
   a system processor coupled to the system port of the dual port data storage device; and
   a service processor coupled to the service port of the dual port data storage device, the service processor further coupled to a first memory containing machine readable medium comprising machine executable code having stored thereon instructions which, when executed by the service processor, cause the service processor to:
      determine when the system processor has experienced an error;
      retrieve the diagnostic information from the dual port data storage device via the service port of the dual port data storage device, when the determining indicates that the system processor has experienced an error; and
      output the retrieved diagnostic information.

2. The device of claim 1 wherein the service processor is configured to operate independently of the system processor.

3. The device of claim 1 wherein the dual port data storage device comprises dual port random access memory (RAM) and the storage server device further comprises a power source coupled to the dual port data storage device such that the dual port data storage device is configured to maintain the diagnostic information after a restart.

4. The device of claim 1 wherein the diagnostic information is stored on the dual port data storage device in a machine readable format and the service processor is further configured to execute the machine executable code to further cause the service processor to:
   convert the retrieved diagnostic information from the machine readable format to a human readable format; and
   output the converted diagnostic information to a file in a second memory.

5. The device of claim 1 wherein the system processor is coupled to the service port of the dual port data storage device via a low pin count (LPC) interface and the service processor is coupled to the system port of the dual port data storage device via a parallel interface.

6. The device of claim 1 wherein the retrieved at least a portion of the diagnostic information is output in response to a request received via a command line interface.

7. The device of claim 1 wherein the diagnostic information comprises one or more data records having a type selected from a message log, a dual in-line memory module (DIMM) error, a system processor error, a Peripheral Component Interface (PCI) bus error, or a serial presence detect (SPD) error.

8. A method, comprising:
   determining, by a service processor, when a system processor has experienced an error, the system processor coupled to a dual port data storage device via a system port of the data storage device;
   retrieving, by the service processor, diagnostic information from the dual port data storage device via a service port of the data storage device, when the determining indicates that the system processor has experienced an error, the diagnostic information comprising error or exception information associated with one or more hardware components; and
   outputting, by the service processor, the retrieved diagnostic information.

9. The method of claim 8 wherein the service processor is configured to operate independently of the system processor, coupled to a first memory storing a service operating system, and configured to execute the service operating system.

10. The method of claim 8 wherein the dual port data storage device comprises dual port random access memory (RAM) coupled to a power source such that the dual port data storage device is configured to maintain the diagnostic information after a restart.

11. The method of claim 8 wherein the diagnostic information is stored on the dual port data storage device in a machine readable format and the method further comprises:
   converting, by the service processor, the retrieved diagnostic information from the machine readable format to a human readable format; and
   outputting, by the service processor, the converted diagnostic information to a file in a memory.

12. The method of claim 8 wherein the system processor is coupled to the service port of the dual port data storage device via a low pin count (LPC) interface and the service processor is coupled to the system port of the dual port data storage device via a parallel interface.

13. The method of claim 8 wherein the interface is a command line interface implemented by a command line interpreter executed by the service processor.

14. The method of claim 8 wherein the diagnostic information comprises one or more data records having a type selected from a message log, a dual in-line memory module (DIMM) error, a system processor error, a Peripheral Component Interface (PCI) bus error, or a serial presence detect (SPD) error.

15. A non-transitory machine readable medium having stored thereon instructions for performing a method comprising machine executable code which when executed by a service processor, causes the service processor to:
   determine when a system processor has experienced an error, the system processor coupled to a dual port data storage device via a system port of the data storage device;
   retrieve diagnostic information from the dual port data storage device via a service port of the data storage device, when the determining indicates that the system processor has experienced an error, the diagnostic information comprising error or exception information associated with one or more hardware components; and output the retrieved diagnostic information.

16. The non-transitory machine readable medium of claim 15 further comprising a service operating system, wherein the service processor is configured to operate independently of the system processor and execute the service operating system.

17. The non-transitory machine readable medium of claim 15 wherein the dual port data storage device comprises dual port random access memory (RAM) coupled to a power source such that the dual port data storage device is configured to maintain the diagnostic information after a restart.

18. The non-transitory machine readable medium of claim 15 wherein the diagnostic information is stored on the dual port data storage device in a machine readable format, the medium further having stored thereon one or more additional instructions that when executed by the service processor further cause the service processor to:

convert the retrieved diagnostic information from the machine readable format to a human readable format; and output the converted diagnostic information to a file in a memory.

19. The non-transitory machine readable medium of claim 15 wherein the system processor is coupled to the service port of the dual port data storage device via a low pin count (LPC) interface and the service processor is coupled to the system port of the dual port data storage device via a parallel interface.

20. The non-transitory machine readable medium of claim 15 wherein the interface is a command line interface implemented by a command line interpreter executed by the service processor.

21. The non-transitory machine readable medium of claim 15 wherein the diagnostic information comprises one or more data records having a type selected from a message log, a dual in-line memory module (DIMM) error, a system processor error, a Peripheral Component Interface (PCI) bus error, or a serial presence detect (SPD) error.

* * * * *